Nov. 21, 1950   G. S. RIGGS   2,530,909
MECHANICAL PIPETTE
Filed Nov. 14, 1947

Inventor
George S. Riggs
By Clarence A. O'Brien
and Harvey B. Jacobson
Attorneys Patented Nov. 21, 1950

2,530,909

UNITED STATES PATENT OFFICE 2,530,909

MECHANICAL PIPETTE

George S. Riggs, Salinas, Calif., assignor of one-third to Carl A. Nisson and one-third to Samuel C. Riggs, Salinas, Calif.

Application November 14, 1947, Serial No. 785,977

3 Claims. (Cl. 73—425.6)

The present invention relates to certain new and useful improvements in what is believed to be a practical and readily adaptable pipette, of a mechanical type, which is especially, but not necessarily, adapted for use by milk inspectors during the period of testing for bacteria which may be present in the milk.

It is a matter of common knowledge in the trade that the pipette now and customarily used by milk inspectors comprises a glass tube which is about .018 in diameter and has suitable graduations to measure the amount of milk taken in through the intake hole at the inlet end. The inspector puts the tube in his mouth and by suction charges it full of milk up to the capacity mark or graduation and then blows it out again on a slide. In addition, he will usually pick up another suitable instrument to spread the sample of milk on the slide before it is placed under the microscope and since samples are taken every thirty seconds or so it can be seen that the time element and other difficulties are encountered and involved. What is more important, bacteria laden samples are hazardous to the health of inspectors.

The object of the present invention is to provide a sample taking pipette of a wholly mechanical type which is simple, practical and adequate in attaining the desired ends.

Briefly, the preferred embodiment of the invention is characterized by a barrel constituting the sample receiving and measuring cylinder, said barrel having a suitably bored intake tip at the inlet end, and being provided with a spring returned manually depressed plunger which is such as to expedite the steps of first sucking the milk, and secondly, expunging it for deposit on the aforementioned microscope slide.

Other objects and advantages of the invention will become more readily apparent from the following description and the accompanying illustrative drawings.

In the drawings, wherein like numerals are employed to designate like parts throughout the views.

Figure 1:
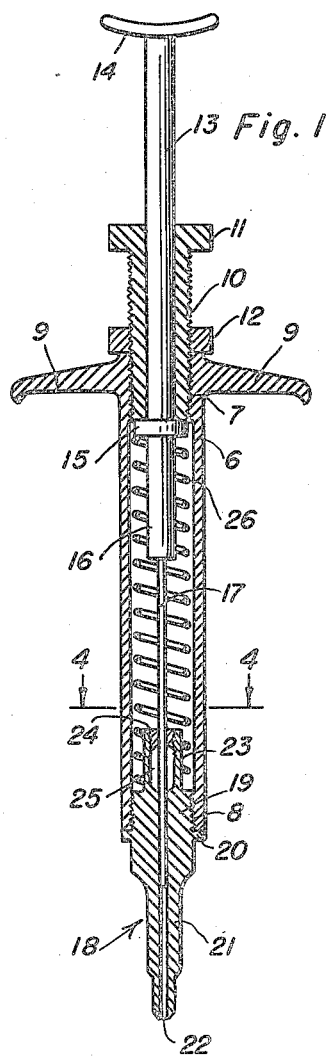
Figure 1 is a view partly in section and partly in elevation of a milk sample taking and measuring pipette constructed in accordance with the principles of the invention.

Reference being had to the structure, better detailed in Figure 1, it will be seen that the barrel, which is of appropriate material, preferably transparent, is denoted by the numeral 6 and this constitutes an appropriate cylinder. It is internally screw-threaded at its upper as at 7 and also internally screw-threaded at the lower end, as at 8. At the upper end I provide integral outstanding finger grips 9. Also there is a bushing 10 which is threaded into the screw-threads 11, said bushing having a knurled finger grip 11 and there being a nut lock provided at 12 to retain the bushing in set positions.

The plunger, including a rod 13, is operable through the bushing and the outer end portion of the rod is provided with a finger piece or depressor 14. A shoulder 15 on the intermediate portion and in the cylinder provides a stop and is engageable with the adjustable bushing, the latter serving as a regulatory shoulder. The inner end portion 16 carries a reduced portion 17 which is in effect a piston.

Reference is had now to the nozzle-like tip 18 which has its screw-threaded shank 19 screwed into the screw-threaded portion 8 and has its flange portion 20 abutting the end of the cylinder. The outer end of the tip is appropriately reduced as at 21 and the entire tip is formed with a bore constituting an intake and discharge passage 22. The aforementioned piston 17 has tight sliding fit in said passage. A neck-like extension 23 on the inner end of the tip and located in the cylinder provides a stuffing box and has a centrally apertured closing nut 24 for the piston and said nut serves to hold in place the desired kind of packing material as at 25. Attention comes now to a coiled spring 26 which is situated in the cylinder, one end thereof surrounding the piston rod and bearing against the stop shoulder 15, the other end surrounding the stuffing box and bearing against the screw-threaded attaching stud or body 19.

Figure 2:
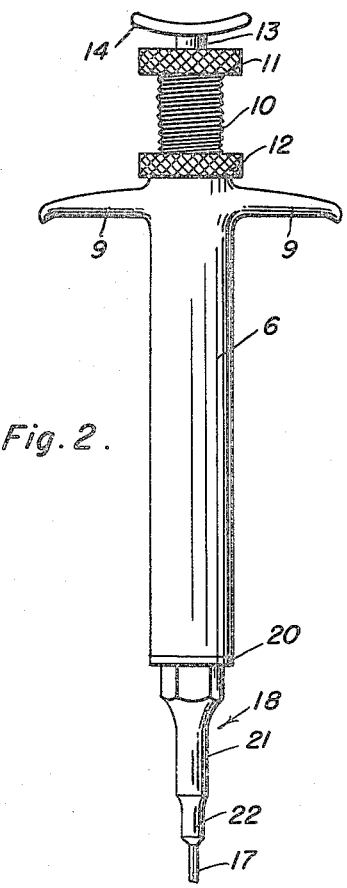
Figure 2 is an elevational view of same showing the plunger projecting beyond the intake tip.
Figure 4:
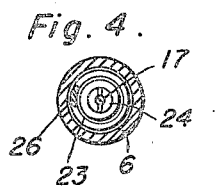
Figure 4 is a cross-section on the line 4—4 of Figure 1, looking in the direction of the arrows.
Figure 3:
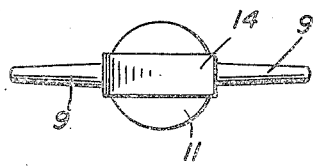
Figure 3 is a top plan view of the structure seen in Figures 1 and 2.

In practice, the device is handled like a plunger-equipped syringe. That is to say, two fingers, first and second, for example, straddle the barrel beneath and grip around the hand grips 9 and the thumb is placed on the thumb piece 14, whereupon the plunger is forced into the cylinder against the tension of the spring. This operates the piston rod 17 through and beyond the bore 22 and it takes the projecting position seen in Figure 2. When the plunger is released, sufficient suction is created that when the nozzle is inserted into a container of milk, a nominal amount of milk is sucked into the passage or bore 22 which at that time becomes a measuring chamber. Then, by forcing the plunger in the opposite direction, the trapped sample of milk is expunged and may be thus squirted on the aforementioned microscope slide (not shown). It is to be mentioned that when the piston element 17 is projected to the protruding position seen in Figure 2, said projecting end portion may be used as a sort of a brush or spreader. That is to say, the so-called "brush" may be used for spreading the milk around on the slide for better microscopic study work.

The construction and operation will be clear, it is submitted, from studied consideration of the specification, drawings and accompanying claims. Therefore, a more extended description is deemed to be unnecessary.

Minor changes in shape, size and rearrangement of parts may be resorted to in actual practice so long as they do not depart from the spirit of the invention nor the scope of the accompanying claims.

Having described the invention, what is claimed as new is:

1. A mechanical pipette for taking milk samples for testing purposes comprising a barrel open and internally screw threaded at opposite ends, said barrel being provided at one end with outstanding finger-grips, a screw-threaded bushing adjustably screwed into said one end, a screw-threaded centrally bored nozzle-tip screwed into the opposite end of said barrel, the bore in said nozzle-tip being relatively restricted and linearly straight from end to end and constituting a milk receiving and storing chamber of predetermined and limited capacity and being adapted to permit a limited amount of milk to be sucked into same and subsequently discharged on a microscopic slide for testing purposes, a plunger including a relatively large rod portion slidable in said bushing, said rod portion having a shoulder abutting said bushing so that the bushing and shoulder portion of the plunger may be adjusted in respect to the barrel, said plunger also including a reduced rod constituting a piston and fitting and operating snugly in the bore in said nozzle tip.

2. A mechanical pipette comprising a cylindrical barrel, a nozzle-like tip plugged into and closing one end of said barrel, said tip having a longitudinal bore constituting a passage and also a container for a predetermined quantity of liquid, a bushing adjustably mounted in the opposite end of said barrel, a plunger operable in said barrel, said plunger having an enlarged portion mounted for reciprocation in said bushing and projecting beyond the outer end of said bushing and being provided with a fingerpiece, finger grips rigidly mounted on said barrel, the bore of said nozzle being relatively restricted in cross section and being linearly straight from end to end, said plunger having a reduced portion fitting snugly and being slidably mounted in the bore of said nozzle and constituting a piston, said bushing constituting an adjustable stop device for said plunger, the portion of the plunger within said barrel being provided with a shoulder which is cooperable with said bushing, and spring means surrounding that portion of the plunger in said barrel, said spring means bearing at one end against said tip and at its opposite end against said stop shoulder.

3. A mechanical pipette for taking milk samples for testing purposes comprising a barrel open and internally screw threaded at opposite ends, said barrel being provided at one end with outstanding finger-grips, a screw-threaded bushing adjustably screwed into said one end, a screw-threaded centrally bored nozzle-tip screwed into the opposite end of said barrel, the bore in said nozzle-tip being relatively restricted and linearly straight from end to end and constituting a milk receiving and storing chamber of predetermined and limited capacity and being adapted to permit a limited amount of milk to be sucked into same and subsequently discharged on a microscopic slide for testing purposes, a plunger including a relatively large rod portion slidable in said bushing, said rod portion having a shoulder abutting said bushing so that the bushing and shoulder portion of the plunger may be adjusted in respect to the barrel, said plunger also including a reduced rod constituting a piston and fitting and operating snugly in the bore in said nozzle tip, that portion of said nozzle tip which extends into the bore of the barrel being reduced in cross section and formed into a stuffing box, and the reduced rod portion being operable in said stuffing box.

GEORGE S. RIGGS.

REFERENCES CITED

The following references are of record in the file of this patent:

UNITED STATES PATENTS

| Number | Name | Date |
| --- | --- | --- |
| 404,105 | Overlach | May 28, 1889 |
| 730,065 | Wilson | June 2, 1903 |
| 928,351 | Wilkinson | July 20, 1909 |
| 1,361,943 | Westfall | Dec. 14, 1920 |
| 1,521,822 | Manzell | Jan. 6, 1925 |
| 2,129,675 | Cole | Sept. 13, 1938 |
| 2,278,253 | Ellsworth | Mar. 31, 1942 |